(12) United States Patent
Dinerman et al.

(10) Patent No.: US 11,110,904 B2
(45) Date of Patent: Sep. 7, 2021

(54) SOLENOID VALVE HAVING ADJUSTABLE SPRING FORCE

(71) Applicant: Robert Bosch GmbH, Stuttgart (DE)

(72) Inventors: Michael Dinerman, Heilbronn (DE); Michael Reichert, Brackenheim (DE); Bernd Haeusser, Neckarwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 16/340,235

(22) PCT Filed: Sep. 20, 2017

(86) PCT No.: PCT/EP2017/073706
§ 371 (c)(1),
(2) Date: Apr. 8, 2019

(87) PCT Pub. No.: WO2018/069007
PCT Pub. Date: Apr. 19, 2018

(65) Prior Publication Data
US 2020/0039491 A1 Feb. 6, 2020

(30) Foreign Application Priority Data
Oct. 10, 2016 (DE) ..................... 10 2016 219 580.8

(51) Int. Cl.
*B60T 15/02* (2006.01)
*F16K 31/06* (2006.01)
(Continued)

(52) U.S. Cl.
CPC .......... *B60T 15/025* (2013.01); *B60T 15/028* (2013.01); *F16K 1/14* (2013.01); *F16K 31/0665* (2013.01);
(Continued)

(58) Field of Classification Search
CPC ...... B60T 15/025; B60T 15/028; B60T 8/363; B60Y 2400/81; F16K 1/14; F16K 31/10;
(Continued)

(56) References Cited

U.S. PATENT DOCUMENTS 6,047,907 A   4/2000  Hornby
6,189,983 B1*  2/2001  Volz ....................... B60T 8/365
                                                          137/596.17
(Continued)

FOREIGN PATENT DOCUMENTS

CN   201779334 U   3/2011
CN   102162545 A   8/2011
(Continued)

OTHER PUBLICATIONS

International Search Report corresponding to PCT Application No. PCT/EP2017/073706, dated Feb. 5, 2018 (English language document) (5 pages).

*Primary Examiner* — Matthew W Jellett
(74) *Attorney, Agent, or Firm* — Maginot, Moore & Beck LLP

(57) ABSTRACT

A solenoid valve, in particular for controlling a brake pressure of a wheel brake of a motor vehicle, includes a pole core, an axially moveably mounted armature, a valve element, a closure element, a plunger, and a pressure spring. One end of the armature is associated with the pole core. The valve sealing element is arranged at another end of the armature. The armature has an axial through-opening. The closure element is force-lockingly and/or interlockingly retained in the axial through-opening in a selectable position. The plunger is axially moveably mounted in the axial through-opening, which provides a connection to the pole core in an installation position. The pressure spring is positioned in the axial through-opening and is retained in a (Continued)

pretensioned manner between the plunger and the closure element. The closure element is designed as a three-dimensionally convex element.

14 Claims, 1 Drawing Sheet

(51) Int. Cl.
*F16K 31/10* (2006.01)
*F16K 1/14* (2006.01)

(52) U.S. Cl.
CPC ...... *F16K 31/0686* (2013.01); *F16K 31/0693* (2013.01); *F16K 31/0696* (2013.01); *F16K 31/10* (2013.01)

(58) Field of Classification Search
CPC ............. F16K 31/0693; F16K 31/0686; F16K 31/0696; F16K 31/0665
USPC ........................................ 251/129.07, 129.15
See application file for complete search history.

(56) References Cited

U.S. PATENT DOCUMENTS

| | | | |
|---|---|---|---|
| 6,206,038 B1* | 3/2001 | Klein | B60T 8/5025 |
| | | | 137/596.17 |
| 6,685,112 B1* | 2/2004 | Hornby | F02M 51/0664 |
| | | | 239/533.2 |
| 9,046,186 B2* | 6/2015 | Mitsumata | F16K 31/0662 |
| 9,080,684 B2* | 7/2015 | Stahr | H01F 7/16 |

FOREIGN PATENT DOCUMENTS

| | | |
|---|---|---|
| CN | 102338241 A | 2/2012 |
| CN | 102781745 A | 11/2012 |
| CN | 202733067 U | 2/2013 |
| DE | 10 2005 000 618 A1 | 7/2006 |
| DE | 10 2009 055 232 A1 | 6/2011 |
| JP | H06-241333 A | 8/1994 |
| JP | 2013-541457 A | 11/2013 |
| WO | 2011/079986 A1 | 7/2011 |

\* cited by examiner

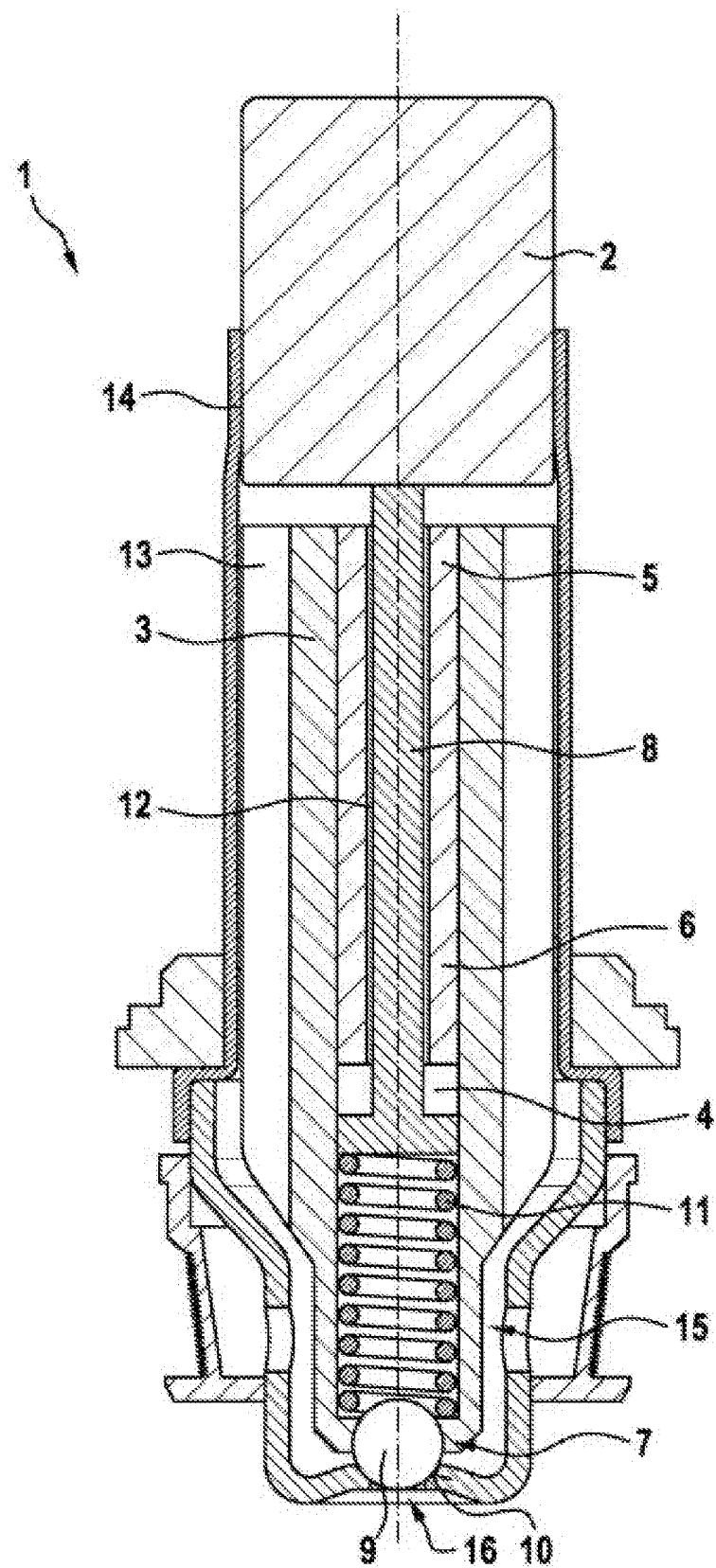

SOLENOID VALVE HAVING ADJUSTABLE SPRING FORCE

This application is a 35 U.S.C. § 371 National Stage Application of PCT/EP2017/073706, filed on Sep. 20, 2017, which claims the benefit of priority to Ser. No. DE 10 2016 219 580.8, filed on Oct. 10, 2016 in Germany, the disclosures of which are incorporated herein by reference in their entirety.

The disclosure concerns a solenoid valve, in particular for controlling a brake pressure of a wheel brake of a motor vehicle, comprising an axially moveably mounted armature, wherein one end of the armature is assigned to a pole core and a valve sealing element is arranged at another end of the armature, wherein the armature has an axial passage, wherein a closure element is retained in a selectable position in the axial passage by force fit and/or form fit, and a plunger is axially moveably mounted in the axial passage and provides a connection to the pole core in an installation position, wherein a compression spring is positioned in the axial passage, wherein the compression spring is held under preload between the plunger and the closure element, wherein the solenoid valve is characterized in that the closure element is designed as a three-dimensionally convex body.

BACKGROUND

Solenoid valves, armatures and methods for production of the generic type are known from the prior art. In particular in brake systems of motor vehicles, solenoid valves are used to control or regulate the pressure buildup in a hydraulic system. Often, so-called normally closed valves are used which are distinguished in that the solenoid valve is in a closed state when the magnet actuator is not powered. The magnet actuator acts on an armature mounted so as to be axially movable in a housing, wherein a valve sealing body is arranged at one end of said armature and cooperates with a corresponding valve seat to close or open a through-flow opening. A pole core of the magnet actuator is assigned to the other end of the armature and, on application of a voltage, exerts a magnetic field on the armature in order to displace this axially. The tolerance chain over several components of the solenoid valve increases the spread of the spring preload force. Miniaturization of the solenoid valves and higher requirements for the control systems impose ever greater precision in the opening pressures. The force of a coil spring is dependent e.g. on the production tolerances of the wire thickness, the winding and the material properties of the wire. The spread of the spring force can be reduced by a correction.

The prior art includes for example patent application DE 10 2009 055 232 A1. This publication concerns a solenoid valve in which the compression spring is held under preload in an axial passage of the armature between a bolt held by force fit and/or form fit in a selectable position in the axial passage and comprising the valve sealing body, and a pressure piece loading the pole core with the preload force and arranged so as to be able to move out of the axial passage up to a stop. The armature thus has an axial passage which extends axially through the entire armature as a channel. The compression spring lies in this axial passage and is held under preload between the bolt and the pressure piece. The bolt comprises the valve sealing body, wherein the valve sealing body is arranged on the bolt, on the side of the bolt facing away from the armature, so as to be able to cooperate with the sealing seat of the solenoid valve. The bolt is held in a selectable position in the axial passage by force fit and/or form fit. This means that the bolt can be held or fixed at different axial positions in the axial passage. When the solenoid valve is mounted, it is now possible to adjust the preload force of the compression spring. By inserting the bolt into the axial passage, the compression spring is preloaded against the pressure piece which, on assembly, is not yet loaded with the pole core but lies against the stop of the armature. This defines the spring chamber, and the preload force can be calculated for example depending on the displacement travel of the bolt. Insertion of the bolt is however relatively complex and cost-intensive, for example a targeted assembly is necessary; furthermore, when installing the bolt in the axial passage, the bolt can tilt.

SUMMARY

Advantageously however, the solenoid valve according to the disclosure allows an adjustable spring force with simple assembly. This is achieved according to the disclosure by the features disclosed herein.

The solenoid valve according to the disclosure, in particular for controlling a brake pressure of a wheel brake of a motor vehicle, comprising an axially moveably mounted armature,
wherein one end of the armature is assigned to a pole core and a valve sealing element is arranged at another end of the armature, wherein the armature has an axial passage, wherein a closure element is retained in a selectable position in the axial passage by force fit and/or form fit, and a plunger is axially moveably mounted in the axial passage and provides a connection to the pole core in an installation position, wherein a compression spring is positioned in the axial passage, wherein the compression spring is held under preload between the plunger and the closure element, is characterized in that the closure element is designed as a three-dimensionally convex body.

This means that because of the selected and set position of the closure element, the spring force is adjusted, in particular the effective preload of the compression spring is set. This setting allows a correction of e.g. the production tolerances of the wire thickness, the winding and the material properties of the wire. With this correction, a spread of the spring force can be reduced. The term "selectable positioning in the axial passage" means that the diameter of the closure element and the diameter of the axial passage at the desired position must be matched to each other accordingly. In particular, it is conceivable that the axial passage has different diameters over its length. For example, a radially inwardly oriented protrusion (also a concavity or tapering of the axial passage) may be formed at the end of the armature (lower end) facing the valve sealing seat. This protrusion reduces the diameter of the axial passage accordingly. A three-dimensionally convex body furthermore means a body which is convex in all three geometric dimensions. Such a body furthermore does not have any large flat faces. In particular, no flat face is formed on an end face of the body, as is the case for example with a cylinder. An example of such a three-dimensionally convex body is a ball.

With a body formed in this way, it is possible to set the desired spring force precisely. This means that the other components may be produced with greater tolerances, whereby these are more economic. For example, precisely turned parts may also be replaced by cheaper plastic injection moldings. Such a precise setting of the spring force furthermore allows a precise function of the solenoid valve. Here, separate mounting as a closed armature assembly is also possible.

Advantageously, a three-dimensionally convex body may furthermore be introduced easily into the axial passage. This virtually excludes a possible tilting, tipping or seizing during assembly, in comparison with other bodies. Assembly of the armature is thus simpler and takes less time. Such a body however has a small adhesion friction surface when introduced into the axial passage with free positioning. It has been found that with corresponding matching of the axial passage and the three-dimensionally convex closure element, a free positioning in the axial passage can be achieved which is fixed over the service life. This leads to an economic solution for variably setting the desired spring force.

In an advantageous embodiment, the solenoid valve is characterized in that the three-dimensionally convex body has round forms.

This means that the closure element substantially has no corners or edges. Advantageously, this avoids seizing or tilting on assembly.

In a possible embodiment, the solenoid valve is characterized in that the three-dimensionally convex body is pressed into the axial passage.

This means that the diameter of the axial passage and the diameter of the closure element are matched accordingly to each other. This also applies in particular for a stepped axial passage. The desired end position of the inserted closure element must be taken into account in the design of the axial passage (and also of the closure element), together with the travel distance of the closure element on insertion. The closure element in particular is pressed into the axial passage at the end of the armature facing the sealing seat. As already stated, this end may have a radially inward protrusion, wherein the closure element is pressed into the remaining axial passage. The protrusion may here have a defined axial length in order to allow adequate positioning of the closure element on insertion. Advantageously, a free axial positioning of the closure element may be achieved if this is pressed into the selected point on insertion and held there permanently.

In a preferred embodiment, the solenoid valve is characterized in that the three-dimensionally convex body bears against the axial passage around the entire periphery.

This means that there are no cavities between the axial passage and the closure element in the mounted position. There are therefore no interruptions such as grooves between the bodies. Advantageously, this may allow an optimal force transmission. Thus for example the surface pressure may be increased. This allows for example a permanent force-fit connection over the service life. Also, this can avoid weakening of the material and undesirable deformation or relaxation.

In an alternative refinement, the solenoid valve is characterized in that the three-dimensionally convex body has an oval longitudinal section, in particular the three-dimensionally convex body is configured as an ovoid.

This means that the closure element has an egg-like form. For example, this may have an oval longitudinal section. Advantageously, furthermore it is configured so as to be rotationally symmetrical. Such a shaping facilitates and simplifies insertion of the closure element in the axial passage. It also avoids tilting on assembly.

In an advantageous embodiment, the solenoid valve is characterized in that the three-dimensionally convex body is configured as an ellipsoid, in particular as a rotational ellipsoid.

Advantageously, such a shape of the closure element also allows simple insertion and avoids seizing on assembly. In an alternative embodiment, the closure element may be designed in any other round form.

In a possible embodiment, the solenoid valve is characterized in that the three-dimensionally convex body is configured as a ball.

A ball may be understood to mean a special design of a three-dimensionally convex body which has a rotational symmetry and in which all radii are of equal length. Advantageously, this avoids the need for oriented assembly. Also, tipping or tilting of the closure element on insertion into the axial passage is avoided. Furthermore, a ball is a standard component. Therefore no special production is required for the convex body.

In a preferred refinement, the solenoid valve is characterized in that the armature has at least one longitudinal groove on its outer casing surface.

This means that the armature has grooves which run in the axial direction over at least a partial region of the outer face. This allows a fluid balance between a valve chamber below the armature and a working chamber above the armature on movement of the armature. The valve chamber is defined for example by the valve body and the armature. The working chamber is defined for example by the pole core, the valve housing and the armature. The grooves allow simple balancing of fluid on movement of the armature. This avoids forces which for example counter a desired armature movement by blocked fluid. This avoids undesirable flow resistance. This is particularly advantageous if the axial passage in the middle of the armature is tightly closed by the closure element.

In an alternative embodiment, the solenoid valve is characterized in that a sleeve is arranged in the axial passage of the armature for fixing and/or guiding the plunger.

This means that a sleeve is provided. This sleeve is positioned inside the axial passage of the armature and in particular pressed in place. The sleeve may here help fix the plunger in a premounted armature assembly, since this must retain a pre-pressure from the compression spring. The sleeve may form a stop for the plunger, so that this is not pushed out of the axial passage but can retain the set pre-pressure. Thereby advantageously, a subassembly for the armature may be formed which can be handled separately. This facilitates mounting of the subassembly in that the plunger is fixed in the armature by the inserted sleeve.

Furthermore, the sleeve may allow guidance for the plunger and guide this on its movement. It is furthermore provided that a gap is formed between the sleeve and the plunger, and runs in the axial direction at least over a part region of the inner face. This allows a fluid balance between a working chamber above the armature and an inner chamber of the axial passage delimited by the closure element on movement of the armature. Advantageously, such a gap allows easy exchange of fluid on movement of the armature. This avoids forces which counter a desired armature movement, for example due to blocked fluid. The gap may be configured as a radial play over the full circumference. Furthermore, the gap may be formed over the entire length of the sleeve.

In an advantageous embodiment, the solenoid valve is characterized in that the three-dimensionally convex body forms the closure element and the valve sealing element.

This means that both the closure element and the valve sealing element are formed by the convex body. The components of the closure element and the valve sealing element are formed integrally. The three-dimensionally convex body then performs both the function of the closure element (contact point for compression spring and setting of preload) and the function of the valve sealing element (sealing of the valve sealing seat in the closed valve position). Advantageously, this allows a function integration in the three-dimensionally convex body. This allows fewer components, less complexity and lower costs.

Furthermore, an armature is provided. The armature according to the disclosure for a solenoid valve, in particular for controlling a brake pressure of a wheel brake of a motor vehicle, wherein the armature is axially moveably mounted in the solenoid valve, wherein one end of the armature is assigned to a pole core and a valve sealing element is arranged at another end of the armature, wherein the armature has an axial passage, wherein a closure element is retained in a selectable position in the axial passage by force fit and/or form fit, and a plunger is axially moveably mounted in the axial passage and provides a connection to the pole core in an installation position, wherein a compression spring is positioned in the axial passage, wherein the compression spring is held under preload between the plunger and the closure element, is characterized in that the closure element is designed as a three-dimensionally convex body.

Furthermore, an armature for a solenoid valve according to any of the embodiments of the above description is provided.

According to the disclosure, furthermore a method is provided for producing an armature for a solenoid valve. According to the disclosure, in the method firstly a sleeve and then the plunger and then the compression spring are introduced into the axial passage, and the closure element is inserted into the axial passage so far until the compression spring, preloaded between the closure element and the plunger, reaches a desired preload force, wherein the preload force of the compression spring is determined by applying a specific counter-force to the plunger.

Also advantageously, a method for producing an armature for a solenoid valve according to any of the embodiments of the above description is provided.

BRIEF DESCRIPTION OF THE DRAWINGS

It is pointed out that the features listed individually in the description may be combined with each other in any technically sensible fashion and disclose further embodiments of the disclosure. Further features and the suitability of the disclosure arise from the description of exemplary embodiments with reference to the attached figures.

The drawings show:

FIG. 1 an extract of a diagrammatic, sectional view of a solenoid valve according to an embodiment according to the disclosure.

DETAILED DESCRIPTION

FIG. 1 shows in a longitudinal, sectional depiction a solenoid valve 1 for a brake system of a motor vehicle. The solenoid valve 1 comprises a housing 14 which is formed as a cylindrical housing and in which an also cylindrical armature 3 is arranged so as to be longitudinally displaceable, in particular axially movable. A pole core 2, which is connected to or arranged in series with the armature 3, is assigned to an upper end of the armature 3 and fixed in the housing 14 for example by means of a weld connection. A valve body 15 held by the housing 14 is assigned to the opposite lower end of the armature 3 and has a through-flow opening 16. The valve body 15 is furthermore provided with a sealing seat 10.

The armature 3 has an axial receiver configured as an axial passage 4 which extends centrally through the armature 3. Towards the lower end of the armature 3, the axial passage 4 is formed tapering such that it has a radially inwardly projecting protrusion 7. A three-dimensionally convex body 9 is pressed into this protrusion 7. The axial length of the protrusion 7 defines the positionability of the body 9 in the armature 3. The body 9 is designed as a closure element of the axial passage 4 and as a valve sealing element so that, in a defined position of the solenoid valve 1, it cooperates sealingly with the valve seat 10 in order to close the through-flow opening 16. The outer diameter of the body 9 and the inner diameter of the axial passage 4, or the inner diameter of the protrusion 7, are selected so as to form a press-fit, so that on assembly of the armature 3, the body 9 is pressed axially into the axial passage 4 up to a desired position. The body 9 is then held there by force fit by the press joint at the armature 3.

A longitudinally displaceable plunger 8 (also called a pressure piece) is also positioned in the axial passage 4 of the armature 3, but is spaced apart from the closure element 9. The plunger 8 has a substantially cylindrical base body 9. The plunger 8 extends through the upper end of the armature 3 in the direction of the pole core 2 and bears against this in the fitted state.

A compression spring 11 is also arranged in the axial passage 4 between the body 9 and the plunger 8, and in the present case is configured as a coil spring which is preloaded between the closure element 9 and the plunger 8. The compression spring 11 lies directly on the body 9. Depending on the positioning of the body 9, the contact position of the compression spring 11 in the lower region of the armature 3 is thus defined. The plunger 8 and the body 9 cooperate such that the compression spring 11, positioned between the plunger 8 and the body 9, is loaded with a force.

Furthermore, a sleeve 5 is introduced, in particular pressed, into the axial passage 4. The sleeve 5 offers a guide for a plunger 8. The upper end of the sleeve 5 is formed so as to be flush with the upper end of the armature 3. Furthermore, the lower end of the sleeve 5 forms an axial stop 6 for the plunger 8. A gap 12 is formed between the sleeve 5 and the plunger 8. This gap 12 allows firstly a degree of radial play and secondly an escape (or slight flow) of the fluid in the axial passage 4 when the armature 3 is moved in the solenoid valve 1. Furthermore, the armature 3 has grooves 13 to allow a fluid balance on movement of the armature 3 in the armature sleeve 5.

Preferably, however, the three-dimensionally convex body 9 is inserted iteratively or in sections ever further into the axial passage 4 until the desired preload force is reached, wherein the preload force is measured after each insertion process of the three-dimensionally convex body 9, in particular by loading the plunger 8 with a defined counter-force in the direction of the compression spring 11. Advantageously, the counter-force is selected such that it corresponds to the desired preload force. When the plunger 8 can no longer be moved axially into the armature 3 by the counter-force, the desired preload force is reached. Then the armature 3 with the three-dimensionally convex body 9, the compression spring 11 and the plunger 8 are mounted as a premounted assembly. Thus in a simple fashion, the solenoid valve 1 allows the preload force of the compression spring 11 to be set precisely and hence to compensate for given component tolerances.

The invention claimed is:

1. A solenoid valve for controlling a brake pressure of a wheel brake of a motor vehicle, comprising:
    a pole core;
    an axially moveably mounted armature including an axial passage, a first end of the armature proximate the pole core;
    a valve sealing element arranged proximate a second end of the armature, the second end opposite the first end;
    a closure element configured as a three-dimensionally convex body and retained in one of a plurality of selectable positions in the axial passage by at least one of a force fit and a form fit;
    a plunger axially moveably mounted in the axial passage and providing a connection to the pole core in an installation position; and
    a compression spring positioned in the axial passage and held under preload between the plunger and the closure element.

2. The solenoid valve as claimed in claim 1, wherein the three-dimensionally convex body includes round forms.

3. The solenoid valve as claimed in claim 1, wherein the three-dimensionally convex body is pressed into the axial passage.

4. The solenoid valve as claimed in claim 3, wherein the three-dimensionally convex body bears against the axial passage around an entire periphery of the axial passage.

5. The solenoid valve as claimed in claim 1, wherein the three-dimensionally convex body includes an oval longitudinal section.

6. The solenoid valve as claimed in claim 1, wherein the three-dimensionally convex body is configured as an ellipsoid.

7. The solenoid valve as claimed in claim 1, wherein the three-dimensionally convex body is configured as a ball.

8. The solenoid valve as claimed in claim 1, wherein the armature includes at least one longitudinal groove on an outer casing surface of the armature.

9. The solenoid valve as claimed in claim 1, further comprising:
    a sleeve arranged in the axial passage of the armature and configured to at least one of fix and guide the plunger.

10. The solenoid valve as claimed in claim 1, wherein the three-dimensionally convex body defines the closure element and the valve sealing element.

11. An armature assembly for a solenoid valve for controlling a brake pressure of a wheel brake of a motor vehicle, comprising:
    an armature with an axial passage;
    a valve sealing element arranged at an end of the armature;
    a closure element configured as a three-dimensionally convex body and retained in one of a plurality of selectable positions position in the axial passage by at least one of a force fit and/or a form fit;
    a plunger is axially moveably mounted in the axial passage and configured to provide a connection to a pole core in an installation position; and
    a compression spring positioned in the axial passage and held under preload between the plunger and the closure element.

12. A method for producing an armature for a solenoid valve, the method comprising:
    introducing a sleeve into an axial passage of the armature;
    introducing a plunger into the axial passage after introducing the sleeve;
    introducing a compression spring into the axial passage after introducing the plunger;
    inserting a closure element into the axial passage;
    fixing the closure element at a selected one of a plurality of selectable positions in the axial passage when the compression spring is preloaded between the closure element and the plunger and reaches a desired preload force; and
    applying a specific counter-force to the plunger in order to determine the preload force of the compression spring.

13. The solenoid valve as claimed in claim 5, wherein the three-dimensionally convex body is configured as an ovoid.

14. The solenoid valve as claimed in claim 6, wherein the three-dimensionally convex body is configured as a rotational ellipsoid.

* * * * *

UNITED STATES PATENT AND TRADEMARK OFFICE
CERTIFICATE OF CORRECTION

Page 1 of 1

PATENT NO. : 11,110,904 B2
APPLICATION NO. : 16/340235
DATED : September 7, 2021
INVENTOR(S) : Dinerman et al.

It is certified that error appears in the above-identified patent and that said Letters Patent is hereby corrected as shown below:

In the Claims

In Claim 11, at Column 8, Line 15: "selectable positions position" should read --selectable positions--.

In Claim 11, at Column 8, Lines 15-16: "at least one of a force fit and/or a form fit" should read --at least one of a force fit and a form fit--.

In Claim 11, at Column 8, Line 17: "a plunger is axially moveably mounted" should read --a plunger axially moveably mounted--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*